(12) United States Patent
Sibout

(10) Patent No.: US 7,888,875 B2
(45) Date of Patent: Feb. 15, 2011

(54) LIGHTING DEVICE SUCH AS A LED READING LIGHT

(75) Inventor: Michel Sibout, Loudun (FR)

(73) Assignee: CEIT Entreprises, Loudun (FR)

( * ) Notice: Subject to any disclaimer, the term of this patent is extended or adjusted under 35 U.S.C. 154(b) by 620 days.

(21) Appl. No.: 11/986,557

(22) Filed: Nov. 20, 2007

(65) Prior Publication Data

US 2008/0143259 A1  Jun. 19, 2008

(30) Foreign Application Priority Data

Nov. 21, 2006 (FR) .................................. 06 10184
Nov. 15, 2007 (EP) .................................. 07291370

(51) Int. Cl.
*B60Q 1/26* (2006.01)

(52) U.S. Cl. .......................... 315/78; 315/82; 315/291; 362/545

(58) Field of Classification Search .................. 315/77, 315/78, 82, 276, 291; 362/234, 244, 240, 362/256, 277, 294, 545
See application file for complete search history.

(56) References Cited

U.S. PATENT DOCUMENTS

| 6,158,882 | A | * | 12/2000 | Bischoff, Jr. | ................ | 362/488 |
| 6,552,900 | B1 | | 4/2003 | Hoefer et al. | | |
| 7,081,722 | B1 | | 7/2006 | Huynh et al. | | |
| 7,164,235 | B2 | * | 1/2007 | Ito et al. | ....................... | 315/82 |
| 2002/0047624 | A1 | * | 4/2002 | Stam et al. | .................. | 315/291 |
| 2002/0105801 | A1 | * | 8/2002 | Martineau | .................... | 362/244 |
| 2002/0145871 | A1 | | 10/2002 | Yoda | | |
| 2005/0276053 | A1 | * | 12/2005 | Nortrup et al. | ............... | 362/294 |
| 2006/0146553 | A1 | | 7/2006 | Zeng | | |
| 2006/0227296 | A1 | * | 10/2006 | Dobler et al. | .................. | 353/33 |
| 2006/0227558 | A1 | | 10/2006 | Osawa | | |
| 2007/0183156 | A1 | * | 8/2007 | Shan | .......................... | 362/277 |
| 2007/0242441 | A1 | * | 10/2007 | Aldrich et al. | .............. | 361/782 |
| 2007/0253202 | A1 | | 11/2007 | Wu et al. | | |
| 2008/0084701 | A1 | * | 4/2008 | Van De Ven et al. | ........ | 362/373 |

FOREIGN PATENT DOCUMENTS

WO  WO 00/62591  10/2000
WO  WO 2006/066530 A1  6/2006

OTHER PUBLICATIONS

Fraen Ordering part Nos. FSG-x1-SSP5-H; FSG series lenses for Seoul Semiconductor LEDs; Aug. 24, 2006.
European Search Report; EP 07 29 1370; Feb. 1, 2008.
French Search Report; FR 0610184; Jun. 4, 2007.

* cited by examiner

*Primary Examiner*—Douglas W Owens
*Assistant Examiner*—Tung X Le
(74) *Attorney, Agent, or Firm*—Carter, Schnedler & Warnock

(57) ABSTRACT

A lighting device of the type used as reading light in a vehicle. The lighting device comprises a single light-emitting diode and internal supply means adapted to generate a current to the single light-emitting diode. The internal supply means are connectable to an external power network. The device has an optical unit to recenter and focus the luminous flux emitted by the single light-emitting diode.

12 Claims, 2 Drawing Sheets

LIGHTING DEVICE SUCH AS A LED READING LIGHT

CROSS-REFERENCE TO RELATED APPLICATIONS

This patent application claims priority on French Patent Application No. 0610184, filed on Nov. 21, 2006, and on European Patent Application No. 07 291 370.0, filed on Nov. 15, 2007.

FIELD OF THE APPLICATION

The present application relates to the field of lighting in volumes such as vehicle cabins. More particularly, the present application relates to a lighting device such as a light-emitting diode reading light.

BACKGROUND OF THE ART

For numerous years, the majority of transportation vehicles (planes, trains, tramways, cars . . . ) have been provided with individual lighting systems. This individual lighting, still known as a reading light, is created by a lamp equipped with an incandescent bulb. These reading lights are powered directly by the operating voltage of the vehicle. The main disadvantage of such system resides in the fact the incandescent bulbs have a limited life time and require regular changing, which increases the cost of maintenance of such systems and has an adverse effect on the comfort of passengers. To overcome these disadvantages, it has been suggested to replace such lighting devices with light-emitting-diode lighting systems. Indeed, light-emitting diodes, commonly known as "LEDs", have a greatly increased life time when compared to incandescent bulbs and their power consumption is far below that of incandescent bulbs. The power supply of such reading lights is generally a remote power supply used for many reading lights simultaneously. Although the maintenance costs of this type of reading light is far below that of the prior art systems, there are many issues with this configuration. For instance, in the event of a power outage, all reading lights connected to this remote power supply stop operating, and the replacement of incandescent-bulb reading lights with LED reading lights cannot be done without modification to the power supply wiring of the vehicle. The connection of the LED reading light in direct replacement of an incandescent light is impossible because of an incompatibility in voltages. In effect, the voltage of the vehicle wiring, such as a train car, is too high with respect to the maximum acceptable voltage set for a LED, and it is therefore necessary to transform this voltage and consequently modify the vehicle wiring. This involves a complex and burdensome intervention, as well as important costs.

As is well known, LED lamps often operate under two states, either off or on at full brightness power. Accordingly, a user can only turn on or off a reading light and cannot vary the brightness, but can modify the orientation of the luminous flux so as to direct the flux to avoid disturbing other passengers of the vehicles. In United States Publication No. 2006/0146553 (by Zeng et al.), a solution to this problem is suggested in the form of a dimmable reading light. This dimmable reading light with emergency lighting capability is used with vehicles, such as planes. This reading light has a housing for attaching the reading light to an interior portion of the vehicle, and a field replaceable unit. The field replaceable unit comprises a power module including a power interface for receiving operational power from a power source, a light module including a plurality of LEDs, and a control module that includes a control interface for receiving a user input signal so that the control module can vary a light intensity that is output from the plurality of LEDs according to the user input signal. This power module may be equipped with power protection means, such as a fuse, a relay . . . for protecting the reading light. The power module may comprise power conversion means producing input power adapted for LEDs and for the control module. The power and control modules are provided on a printed circuit board positioned inside the replaceable unit, but either one of the modules can be positioned outside of the replaceable unit. The printed circuit board has a processor such as a microprocessor. Moreover, the field replaceable unit may include a temperature sensor allowing an increase in the life time thereof. In a given embodiment, the temperature sensor is on the printed circuit board to measure the temperature of the heat sink so as to protect the processor. The power module may have two interfaces and may include a dc/dc converter and a voltage regulating means.

In United States Publication No. 2002/0145871 (by Yoda), there is suggested a cabin light with a housing having a spherical side surface rotatably installed in a panel. A printed circuit board has LEDs, each provided with a reflector concave portion, the portions forming a reflector unit. A connector is connected at a tip end to a cord for feeding electricity to the LEDs and, on another side to pins that protrude from a cylindrical element made of a conductive metal, at the end of which a feeding terminal is provided. This above-described lamp is well suited for interchangeability with cabin lights using incandescent bulbs. A heat sink is provided on the rear face of the printed circuit board. This device comprises condenser portions and, by way of the reflector concave portions and fish-eye steps, the diffused light is suitable for reading. A controlled distribution of the light is obtained by controlling the light by way of a condenser and diffuser means. Each reflector unit is made of concave aluminum walls that are eventually filled with transparent resin defining a columnar recess portion with a convex surface to condense the luminous flux of the LED.

The above-described reading lights always use a plurality of LEDs for each single lighting unit. One of the references describes the control of the brightness intensity of the set of LEDs, and the other reference teaches the control of the luminous flux of each LED so as to define a condensed beam projector producing a diffused light illuminating a zone of about 50 cm in diameter at about 1 m from the surface of the lamp. Therefore, it is noted from these reading lights that a given amount of LEDs is required each time to provide suitable lighting.

SUMMARY OF THE APPLICATION

The aim of the present application is to provide a lighting device such as LED reading light adapted to be installed in place of a reading light without requiring intervention on the wiring of the vehicle, and that also advantageously provides an improved compact character, in particular by using fewer components, and thereby producing an economical reading light offering optimal lighting qualities.

For this purpose, the present application provides a lighting device of the type used as reading light in a vehicle, comprising a single light-emitting diode and internal supply means adapted to generate a current to the single light-emitting diode, the internal supply means being connectable to an external power network, the device having an optical unit to recenter and focus the luminous flux emitted by the single light-emitting diode.

Therefore, the internal or integrated power supplies provided in the lighting device according to the present application, allow the connection of the device directly to an external power supply network, such as the existing power network of the vehicle and outputting, for example in the case of a train car, an operating voltage between 16 V and 30 V (24 V), between 50 V and 90 V (72 V), or between 90 V and 150 V (110 V) in direct current while a light-emitting diode operates under a voltage of about 4 V.

Moreover, in a particularly advantageous manner, the device according to the present application allows a luminous beam of a suitable level of lux (about 100 lux) to be obtained from a single diode and optical unit, at a desired distance, i.e., the distance between the device and a user, namely about 90 cm while using a single light-emitting diode. Accordingly, the lighting device of the present application provides an improved lighting efficiency while being more economical and simpler to implement because of the use of a single light-emitting diode.

As another advantage, the internal supply means comprise at least operating voltage transforming means, a current generator connectable to the light-emitting diode and connection means to said external power network, any one of which is provided on at least one printed circuit. The operating voltage transformer means and the current generator feeding the light-emitting diode are made of electronic components including any one of transistors, self-capacitors, resistors, integrated circuits, appropriately chosen as a function of the external power network and of a voltage supplied by the external network, to which the reading light is connectable.

Such reading-light type of lighting device has a body made of polycarbonate, aluminum or any other appropriate material, in the form of a sphere when the reading light is orientable, which body encloses a single light-emitting diode, the internal supply means, as well as an optical unit made of an appropriate material such as polymethyl methacrylate, glass, allowing the homogeneous diffusion of the luminous flux emitted by the single LED. Preferably, the optical unit is made of a complex optical structure.

In a first embodiment of the present application, the device of the present application comprises a printed circuit on which are positioned the internal supply means and on which the LED is also positioned. In effect, with a lighting device comprising a single light-emitting diode, space is freed on the printed circuit so as to provide additional components such as internal supply means, resulting in a compact device.

According to another embodiment of the present application, the device of the present application comprises two printed circuits, a first one of said printed circuits supporting the light-emitting diode and a portion of the supply means, and a second one of the printed circuits supporting another portion of the supply means. This type of configuration allows the compact character of the lighting device of the present application to be preserved, and allows the installation of the lighting device in replacement of an incandescent-bulb reading light without the need to modify the existing power wiring of the vehicle or without the need for an additional remote converter. It is however connectable to a voltage of up to 230 V in alternative current, or 150 V in direct current, as the internal supply means supported by the second printed circuit are adapted to be connected to the power network.

The direct supply or integrated supply of the lighting device of the present application allows the lighting device to be installed in replacement of an incandescent-lamp reading light without the need to modify the existing power wiring of the vehicle or without the need to add a remote converter. Therefore, such a system can cover the whole of the lighting demands in the field of transportation (for example 24 V dc, 72 V dc, 110 V dc, 120 V ac, 230 V ac), by the simple connection of the internal power means to the power network with which they will be used. Also, each reading light is independent and can be replaced individually when not operational. Finally, the power supply consumption is related to the lighting power required by the users and is of about 3 W.

In a preferred embodiment, the lighting device of the present application also has means for dissipating the heat generated by the LED, such as an aluminum heat sink connected to the printed circuit. The heat sink is therefore used as a support for the first printed circuit, which further strengthens the compact character of the device of the present application.

In another preferred embodiment, it is considered to provide a temperature detector in the lighting device on the printed circuit, such that the internal supply means can be cut off when the temperature is above a given threshold (for instance, about 80° C.).

Also, the lighting device may be provided with complementing means to remove the heat generated by the LED. These means are defined by openings provided in the body of the lighting device, preferably about the optical unit and allowing communication between the body and the exterior environment, so as to vent the interior of the device. Preferably, a membrane is also provided, the membrane being permeable to air but not to dust.

The present application is preferably implemented in vehicles such as train cars. However, the above-described LED reading light with integrated supply may be used in different types of passenger vehicles in which individual lighting is required, such as trains, tramways, planes, boats (ferry), buses or cars.

The LED reading lights with integrated supply according to the present application can be of different shapes. They are adaptable to the esthetics and the design of the vehicle. They may be fixed or oriented depending on the vehicle into which they will be inserted.

The diffused light can be cool white or warm white depending on the nature of the LED used.

DESCRIPTION OF THE PREFERRED EMBODIMENTS

Figure 1:
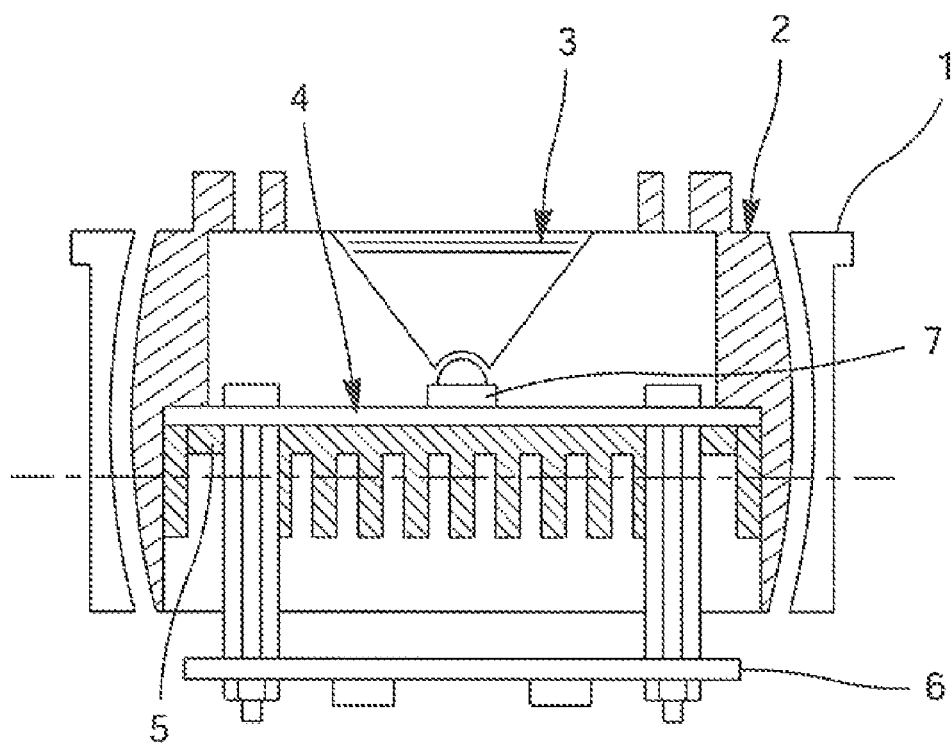
FIG. 1 is a schematic sectional view of an example of a LED reading light in accordance with a first embodiment of the present application.

The lighting device according to the present application, or LED reading light, illustrated in FIG. 1 has a body or housing shaped as a sphere 2 supporting optical unit 3. A sphere support 1 supports the sphere 2. Inside the sphere 2 are also provided internal supply means for the lighting device, as supported by printed circuit 4, to which is connected a single light-emitting diode 7. Connection means 6 define the connection to the external power network, and are also connected to the printed circuit 4 so as to be positioned on the rear of the reading light. Voltage transforming means for the external network and means for generating a current to the LED consist of common electronic components such as transistors, self-capacitors, resistors, integrated circuits (e.g., diced), etc., appropriately chosen as a function of the external power network to which the reading light is connectable.

A heat sink 5 for allowing the removal of heat is preferably mounted in compression with the printed circuit 4, to the rear thereof, so as to remove as much heat as possible. The connection means 6 (i.e., connection), positioned to the rear of the reading light, allow the power supply to the reading light by a direct connection of the reading light to the electrical wiring or the existing supply network of the vehicle. This configuration advantageously allows the direct connection of the reading light to existing wiring of the vehicle without requiring modification to the wiring.

Figure 2:
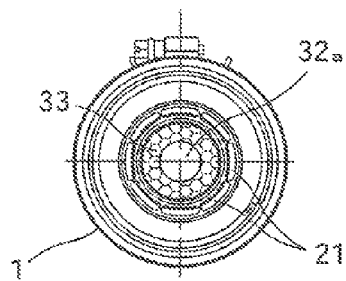
FIG. 2 is a front perspective view of a variant of the reading light of FIG. 1.
Figure 3:
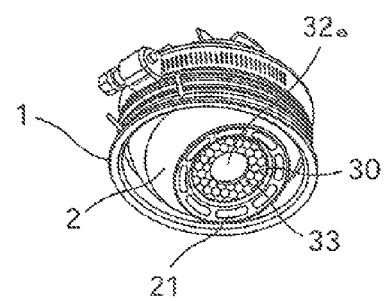
FIG. 3 is a side perspective view of the reading light of FIG. 2.
Figure 4C:
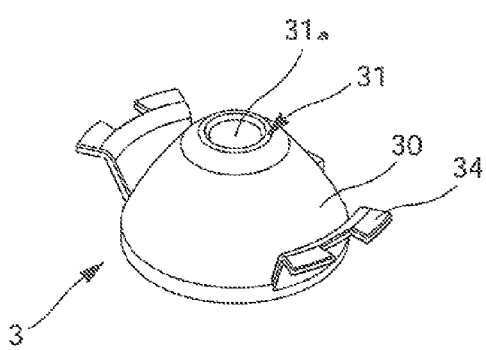
FIG. 4C is a perspective view of the optical unit of FIG. 4A.
Figure 4A:
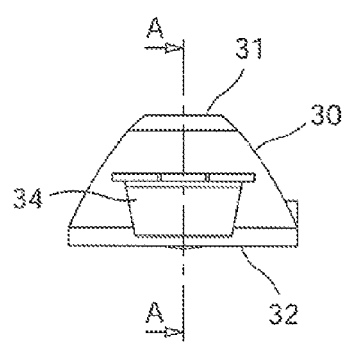
FIG. 4A is a plan view of an optical unit of the reading light of the present application.
Figure 4B:
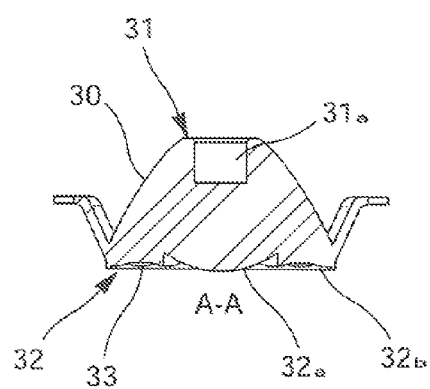
FIG. 4B is a sectional view of the optical unit of FIG. 4A along section line A-A.

The body or housing 2, as can be seen in FIG. 2, defines openings 21 positioned so as to be in the periphery of the optical unit 3. These openings 21 allow communication between the inside of the body 2 and the external environment, and therefore assist in the removal of heat as complementing means to dissipate heat.

The optical unit consists of polymethyl methacrylate (PMMA), allowing a homogeneous diffusion of the luminous flux emitted by the single LED 7. This optical unit has a complex one-piece structure of circular section having a first surface 31, in which is defined a frustoconical volume 31a in which the LED 7 may be positioned. A second surface 32 is positioned opposite to the first surface 31, and defines an unbroken central portion 32a facing the volume 31a and forming an aspherical lens, and a peripheral portion 32b made of aspherical microlenses 33 arranged in a honeycomb hexagonal network. A reflector portion 30 is provided in the one-piece optical unit 3 and defines an aspherical surface, quasi-parabolic extending between the two surfaces 31, 32.

Therefore, the rays emitted by the LED 7 and projecting through the wall of the frustoconical volume 31a are then reflected by the reflector portion 30 and then refracted by the peripheral portion provided with the aspherical microlenses 33, whereas the rays of the LED 7 projecting through the base of the volume 31a are refracted by the aspherical central portion 32a.

Legs 34 are defined in this complex single piece 3 to facilitate in its fastening within the reading light.

The above-described complex optical unit advantageously allows the rays emitted by the LED 7 to be recentered and focused to form a luminous surface of sufficient intensity to define lighting for vehicles covering a distance corresponding to the average distance between the lighting device and a passenger of the vehicle.

The present application is of course not limited to the above-described embodiment, but includes all possible embodiments set forth in the dependent claims.

The invention claimed is:

1. A lighting device useable in reading light in a vehicle, comprising a single light-emitting diode and internal supply means adapted to generate a current to the single light-emitting diode, the internal supply means being connectable to an external power network, the device having an optical unit to recenter and focus the luminous flux emitted by the single light-emitting diode, the optical unit being made of a complex single-piece optical structure having a first surface in which is positioned a frustoconical volume accommodating the light-emitting diode, a second surface opposite to the first surface and having an unbroken central portion facing said volume and forming an aspherical lens, and a peripheral portion having aspherical microlenses in a honeycomb hexagonal network, the optical structure having a reflector portion forming an aspherical surface that is quasi-parabolic between said first surface and second surface.

2. The device according to claim 1, wherein the internal supply means comprise at least operating voltage transforming means, a current generator connectable to the light-emitting diode and connection means to said external power network, any one of which is provided on at least one printed circuit.

3. The device according to claim 2, wherein the light-emitting diode is connected directly to the printed circuit of the internal supply means.

4. The device according to claim 1, wherein the operating voltage transformer means and the current generator feeding the light-emitting diode are made of electronic components including any one of transistors, self-capacitors, resistors, integrated circuits, appropriately chosen as a function of the external power network and of a voltage supplied by the external network, to which the reading light is connectable.

5. The device according to claim 1, further comprising a body accommodating the light-emitting diode and made of one of polycarbonate and aluminum, and wherein the internal supply means and the optical unit are made of one of polymethyl methacrylate and glass.

6. The device according to claim 5, wherein the body is sphere-shaped and is supported in a sphere support so as to be orientable.

7. The device according to claim 1, wherein the device has two printed circuit boards, a first one of said printed circuit boards supporting the light-emitting diode and a portion of the supply means, and a second one of the printed circuit boards supporting another portion of the supply means.

8. The device according to claim 1, further comprising means to remove heat generated by the light-emitting diode on the printed circuit.

9. The device according to claim 8, further comprising complementing means to remove heat defined by openings provided in a body of the lighting device, preferably about the optical unit and allowing communication between the body and an exterior environment for venting of an interior of the device.

10. The device according to claim 9, wherein a membrane is provided in the openings, the membrane being permeable to air but not to dust.

11. The device according to claim 10, further comprising a temperature detector on the printed circuit so as to cut the internal supply means when a temperature is above a given threshold.

12. The device according to claim 8, wherein the means to remove heat are an aluminum heat sink on the printed circuit.

* * * * *